United States Patent
Cui et al.

(10) Patent No.: US 8,921,730 B2
(45) Date of Patent: Dec. 30, 2014

(54) METHOD OF FABRICATING A COMPONENT AND A MANUFACTURED COMPONENT

(75) Inventors: Yan Cui, Greer, SC (US); Srikanth Chandrudu Kottilingam, Simpsonville, SC (US); Daniel James Dorriety, Travelers Rest, SC (US); Brian Lee Tollison, Honea Path, SC (US); Dechao Lin, Greer, SC (US); Hai Buu Sam, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 744 days.

(21) Appl. No.: 13/166,215

(22) Filed: Jun. 22, 2011

(65) Prior Publication Data

US 2012/0328902 A1    Dec. 27, 2012

(51) Int. Cl.
| | |
|---|---|
| *B23K 9/04* | (2006.01) |
| *B23K 9/235* | (2006.01) |
| *B23K 10/02* | (2006.01) |
| *B23K 26/34* | (2014.01) |
| *B23K 26/30* | (2014.01) |
| *B23K 26/32* | (2014.01) |
| *B23K 35/30* | (2006.01) |
| *C22C 19/05* | (2006.01) |

(52) U.S. Cl.
CPC .................. *B23K 9/044* (2013.01); *B23K 9/235* (2013.01); *B23K 10/027* (2013.01); *B23K 26/345* (2013.01); *B23K 26/421* (2013.01); *B23K 26/3206* (2013.01); *B23K 26/3213* (2013.01); *B23K 35/3033* (2013.01); *C22C 19/056* (2013.01); *C22C 19/057* (2013.01); *B23K 2201/001* (2013.01)

USPC .................. 219/76.12; 427/405; 427/540

(58) Field of Classification Search
USPC ............ 427/540, 580, 404, 405, 406; 164/75, 164/91, 98; 219/76.1, 76.13, 76.14, 76.16, 219/76.12
See application file for complete search history.

(56) References Cited

U.S. PATENT DOCUMENTS

| | | | | |
|---|---|---|---|---|
| 2,994,762 | A | * | 8/1961 | Hoyt ........................ 219/76.15 |
| 3,277,267 | A | * | 10/1966 | Blaszkowski ............. 219/76.13 |
| 3,360,630 | A | * | 12/1967 | Blaszkowski ............. 219/76.13 |
| 3,546,091 | A | * | 12/1970 | Rossner et al. ........... 219/76.14 |
| 3,778,586 | A | * | 12/1973 | Breton et al. ............. 219/76.12 |
| 4,186,864 | A | * | 2/1980 | Ishimaru et al. ................ 219/73 |
| 4,346,281 | A | * | 8/1982 | Inoue ........................ 219/76.13 |
| 4,405,851 | A | * | 9/1983 | Sheldon .................... 219/76.13 |
| 4,903,888 | A |   | 2/1990 | Clark et al. |
| 5,038,014 | A | * | 8/1991 | Pratt et al. ................ 219/121.64 |

(Continued)

FOREIGN PATENT DOCUMENTS

GB        2228224 A    8/1990

OTHER PUBLICATIONS

Search Report and Written Opinion from corresponding EP Application No. 12172275.5-2302 dated Oct. 24, 2012.

*Primary Examiner* — Geoffrey S Evans
(74) *Attorney, Agent, or Firm* — McNees Wallace & Nurick LLC

(57) ABSTRACT

A method of fabricating a component and a fabricated component are disclosed. The method includes depositing a material to a component and manipulating the material to form a boundary region and a filler region for desired properties. The component includes the boundary region and the filler region, thereby having the desired properties.

18 Claims, 6 Drawing Sheets

(56) References Cited

U.S. PATENT DOCUMENTS

| | | | | |
|---|---|---|---|---|
| 6,120,624 | A * | 9/2000 | Vogt et al. | 148/675 |
| 6,274,839 | B1 * | 8/2001 | Stone et al. | 219/76.12 |
| 2003/0103862 | A1 * | 6/2003 | Bouse et al. | 420/448 |
| 2003/0189028 | A1 * | 10/2003 | Wright et al. | 219/76.12 |
| 2004/0229072 | A1 * | 11/2004 | Murphy | 420/448 |
| 2005/0050705 | A1 * | 3/2005 | Segletes et al. | 29/402.13 |
| 2006/0086708 | A1 * | 4/2006 | Coleman et al. | 219/137 WM |
| 2006/0228465 | A1 * | 10/2006 | Zurecki | 427/8 |
| 2007/0056933 | A1 * | 3/2007 | Collins et al. | 219/76.14 |
| 2011/0073636 | A1 | 3/2011 | Arjakine et al. | |
| 2011/0089150 | A1 * | 4/2011 | Arjakine et al. | 219/121.64 |
| 2012/0201713 | A1 * | 8/2012 | Esser | 420/448 |

* cited by examiner

METHOD OF FABRICATING A COMPONENT AND A MANUFACTURED COMPONENT

FIELD OF THE INVENTION

The present invention is directed to manufactured components and processes of fabricating manufactured components. In particular, the present invention is directed to processes for welding and welded components.

BACKGROUND OF THE INVENTION

The operating temperature within a gas turbine is both thermally and chemically hostile. Advances in high temperature capabilities have been achieved through the development of iron, nickel, and cobalt-based superalloys and the use of environmental coatings capable of protecting superalloys from oxidation, hot corrosion, etc.

In the compressor portion of a gas turbine, atmospheric air is compressed to 10-25 times atmospheric pressure, and adiabatically heated to 700° F.-1250° F. (371° C.-677° C.) in the process. This heated and compressed air is directed into a combustor, where it is mixed with fuel. The fuel is ignited, and the combustion process heats the gases to very high temperatures, in excess of 3000° F. (1650° C.). These hot gases pass through the turbine, where airfoils fixed to rotating turbine disks extract energy to drive an attached generator which produces electrical power. To improve the efficiency of operation of the turbine, combustion temperatures have been raised. Of course, as the combustion temperature is raised, steps must be taken to prevent thermal degradation of the materials forming the flow path for these hot gases of combustion.

Many hot gas path components are fabricated using welding processes. It is desirable for weld joints in or around such components to have increased resistance to strain age cracking, thereby extending the operational range of the components and/or the usable life of the components.

A welded component and a process of welding a component that do not suffer from one or more of the above drawbacks would be desirable in the art.

BRIEF DESCRIPTION OF THE INVENTION

In an exemplary embodiment, a method of fabricating a component includes depositing a first molten material application onto a surface to form an at least partially solidified layer, manipulating at least a portion of the at least partially solidified layer to form a boundary region, and depositing a second molten material application onto the boundary region to form a filler region.

In another exemplary embodiment, a method of fabricating a component includes depositing a first material onto at least a portion of a crack sensitive fusion boundary of the component, manipulating the material to form a boundary region, and depositing a second material onto the boundary region. The boundary region provides resistance to strain age cracking within the crack sensitive fusion boundary.

In another exemplary embodiment, a welded component includes a boundary region positioned at least partially on a crack sensitive fusion boundary and a filler region positioned at least partially on the boundary region. The boundary region provides resistance to strain age cracking within the crack sensitive fusion boundary.

DETAILED DESCRIPTION OF THE INVENTION

Provided is a manufactured component and a process of fabricating a component. Embodiments of the present disclosure have a decreased stress level due to high preheat or very low heat input, have a transition weld deposit resistant to strain age cracking, have increased resistance to crack formation, have lower base metal dilution, permit repair or casting defects, and combinations thereof.

Figure 1:
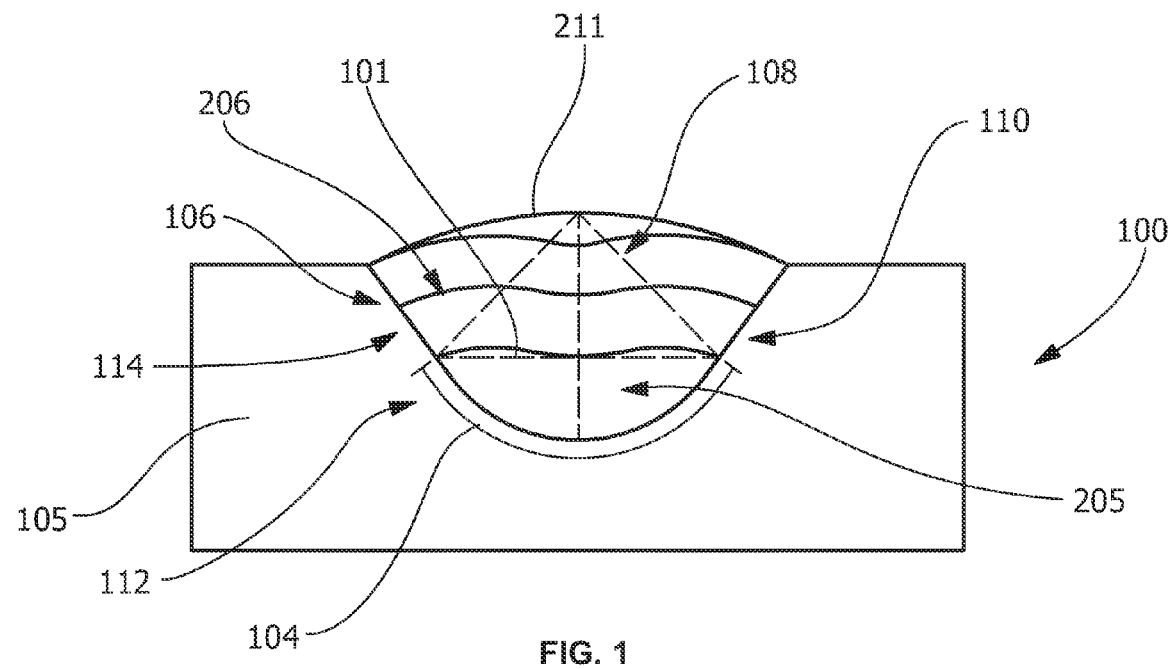
FIG. 1 is a schematic view of an exemplary component according to the disclosure.

FIG. 1 shows an exemplary component 100 fabricated by an exemplary process. The component 100 is a welded component and includes a boundary region 205 formed by a boundary application layer 102 (see FIG. 3) positioned at least partially on a crack sensitive fusion boundary 104 of a base metal 105 and a filler region 106 positioned at least partially on the boundary region 205. The boundary region 205 provides resistance to strain age cracking within the crack sensitive fusion boundary 104. As used herein, the term "crack sensitive fusion boundary" refers to a region of a component with heightened sensitivity to cracking in comparison to other regions, for example, due to casting dilution effect. For example, as shown in FIG. 1, in one embodiment, the crack sensitive fusion boundary 104 extends below a base 101 of an isosceles triangle 108 formed within a semicircular or semispherical cavity 110 of the component 100. In one embodiment, the crack sensitive fusion boundary 104 is within a lower portion 112 of the cavity 110, for example, about ⅓ of the depth of the cavity 110, and/or is not within the upper portion 114 of the cavity 110. As will be appreciated, in some embodiments, the cavity 110 includes alternative geometries including, but not limited to, a curved geometry that is not a semicircular or semispherical, channel-like geometry, a rectilinear geometry, a complex geometry (for example, turbine components such as blades, nozzles, shrouds, and other complex components), or any other suitable geometry.

Figure 2:
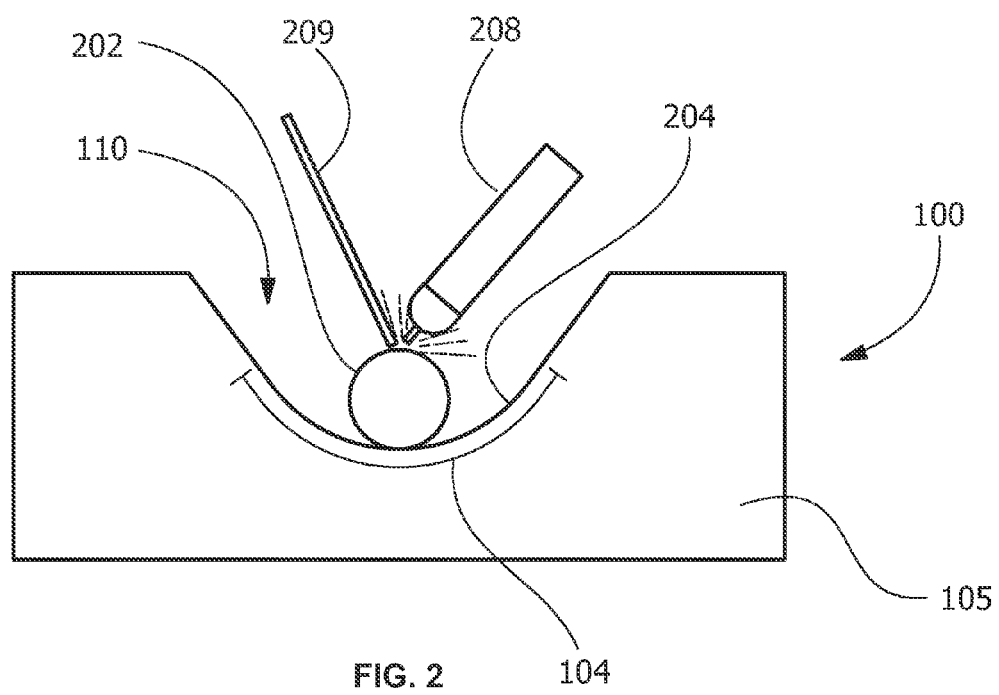
FIG. 2 is a diagrammatic view of an exemplary component having molten material applied according to an exemplary process of the disclosure.
Figure 3:
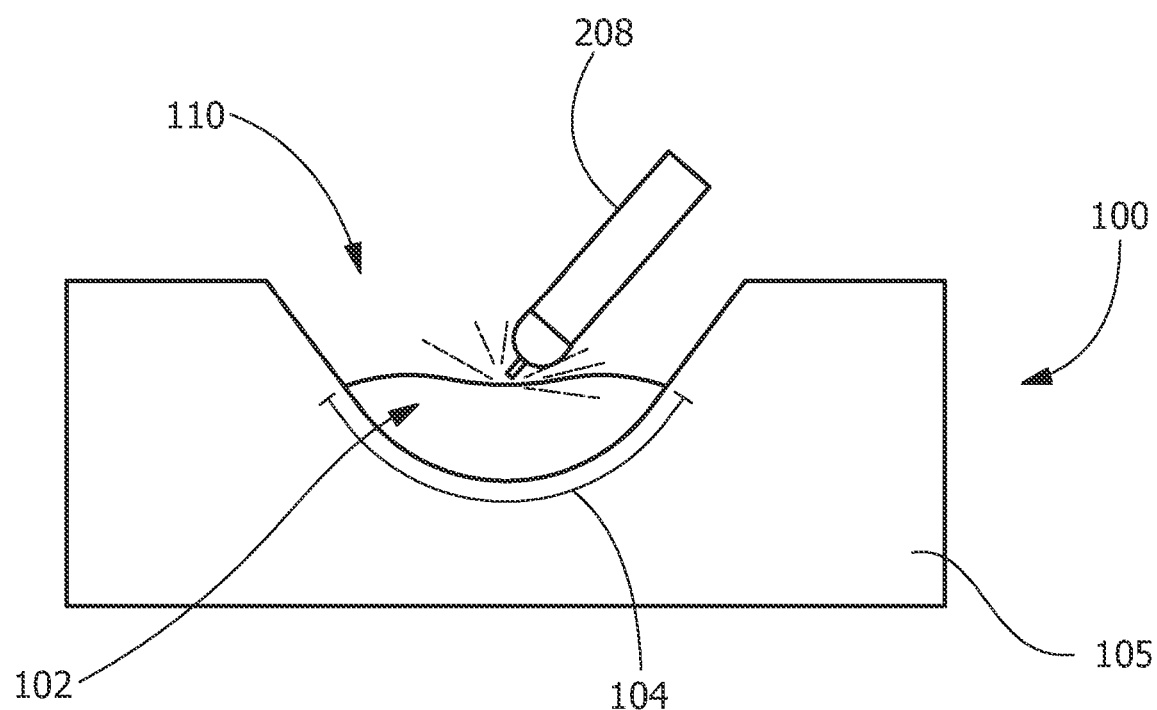
FIG. 3 is a diagrammatic view of an exemplary melting of material according to an exemplary process of the disclosure.
Figure 4:
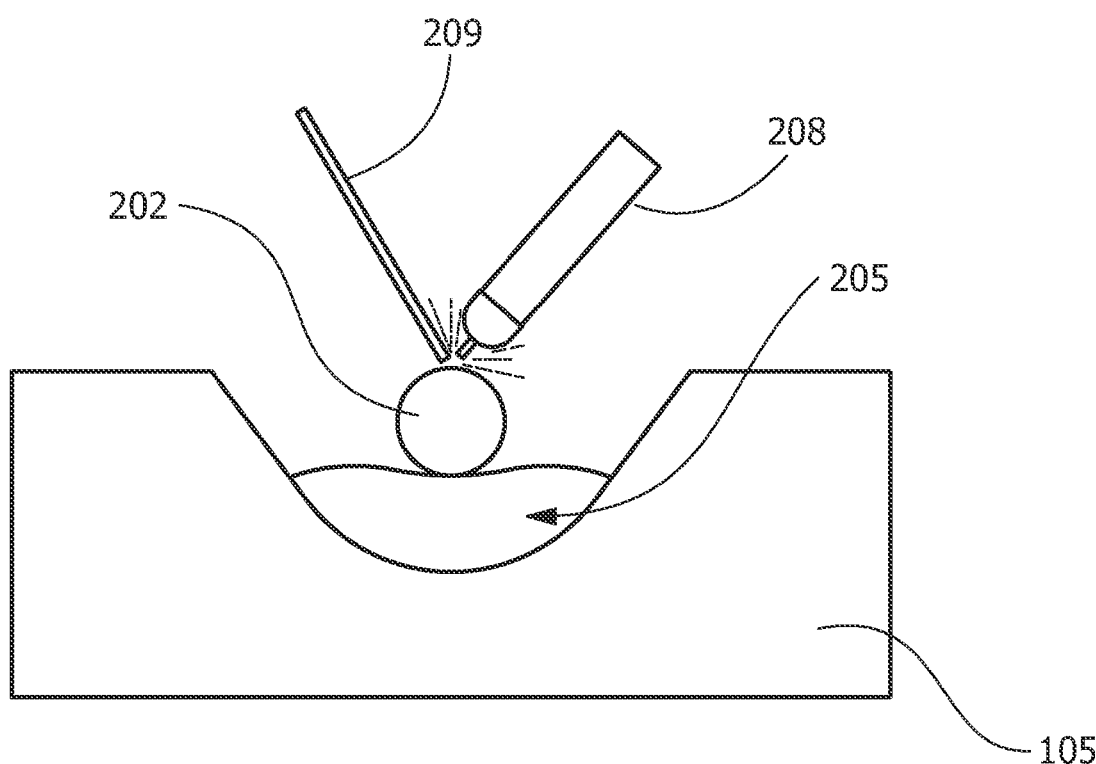
FIG. 4 is a diagrammatic view of an exemplary component having molten material applied to a boundary region according to an exemplary process of the disclosure.
Figure 5:
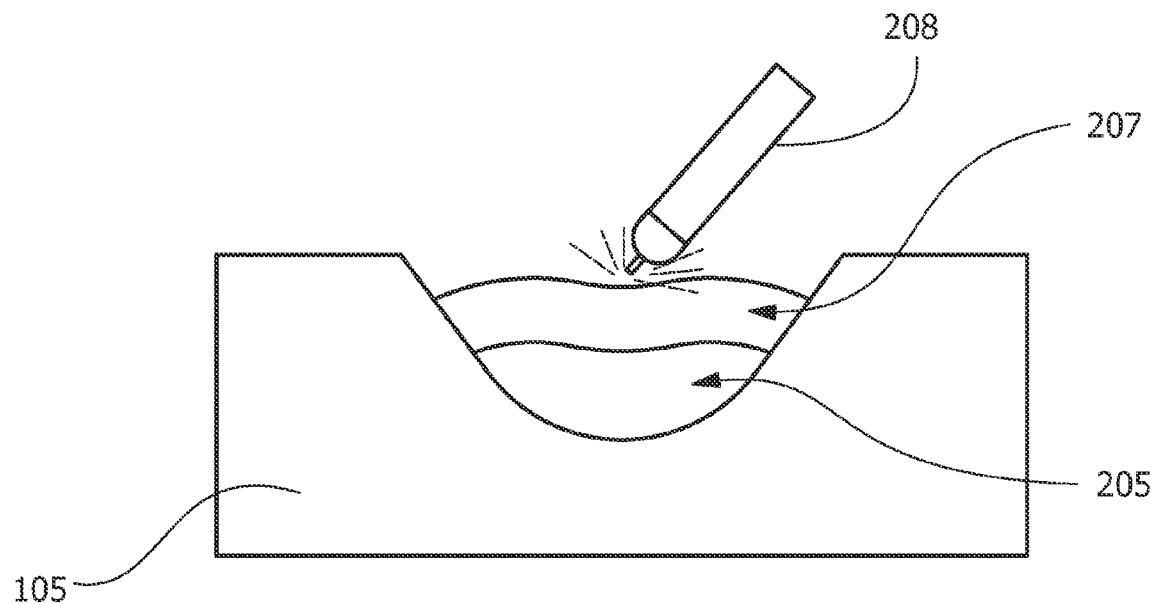
FIG. 5 is a diagrammatic view of an exemplary melting of material applied to a boundary region according to an exemplary process of the disclosure.
Figure 6:
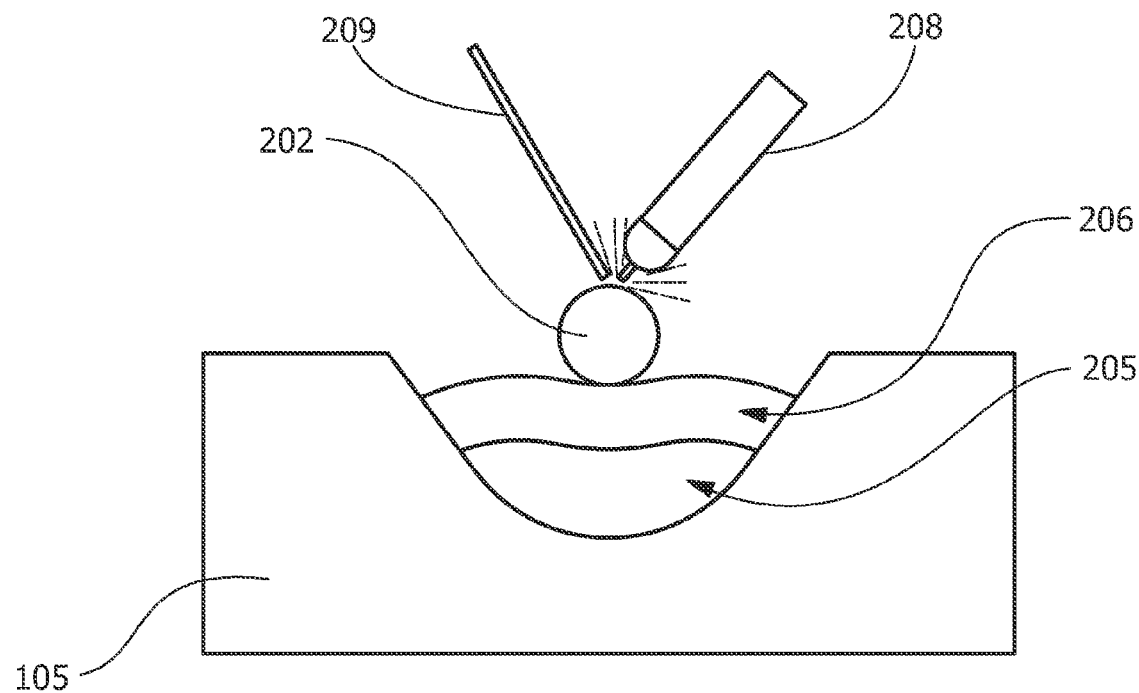
FIG. 6 is a diagrammatic view of an exemplary component having molten material applied according to an exemplary process of the disclosure.
Figure 7:
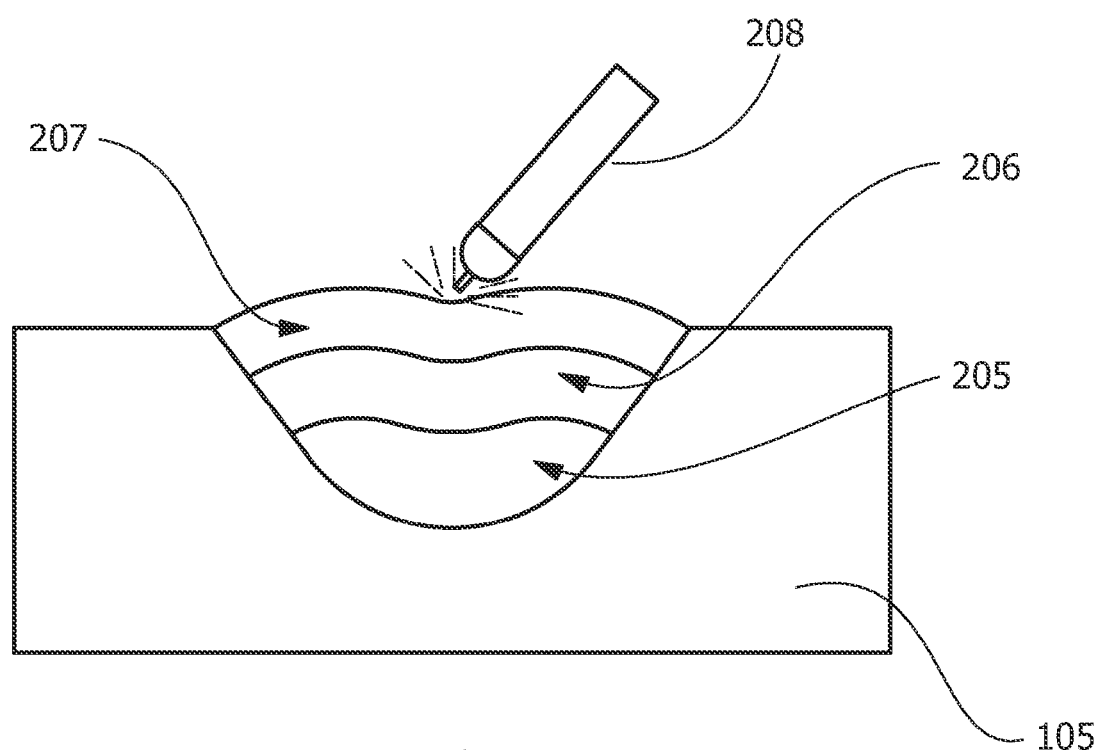
FIG. 7 is a diagrammatic view of an exemplary melting of material according to an exemplary process of the disclosure.

As shown in FIGS. 2 and 3, according to the exemplary process, the component 100 is fabricated by depositing (for example, pre-dripping) and then manipulating (for example, smearing, buttering, or otherwise manipulating) a molten material 202 onto at least a portion of a surface 204 of the component 100 to form the boundary application layer 102 and then the boundary region 205 (see FIG. 4). In one embodiment, the molten material 202 is applied in conjunction with a weld torch 208 and a weld rod 209. Welding according to the disclosure is performed by any suitable weld mechanism/process, including, but not limited to plasma weld processes, arc weld processes, laser or pulse weld processes, tungsten inert gas weld processes, other suitable weld processes, or combinations thereof.

The weld rod 209 is one or more alloys capable of being melted by the weld torch 208. The weld rod 209 is capable of being in the form of a rod or any other suitable shape (such as a twisted rod) capable of being melted by the weld torch 208. In one embodiment, depositing the molten material 202 according to the process increases resistance to melt pool turbulence, increases resistance to dilution of the base metal 105, decreases heat input used, increases resistance to liquation and strain age cracking, decreases reliance upon and/or replaces heat treatment utilized after welding, and combinations thereof. In one embodiment, the molten material 202 is applied without localized melting of the base metal 105.

The base metal 105 and/or the molten material 202 include a superalloy material. One suitable superalloy material is a nickel-based alloy having, by weight, up to about 15% chromium, up to about 10% cobalt, up to about 4% tungsten, up to about 2% molybdenum, up to about 5% titanium, up to about 3% aluminum, and up to about 3% tantalum. In one embodiment, the superalloy material has a composition by weight of about 14% chromium, about 9.5% cobalt, about 3.8% tungsten, about 1.5% molybdenum, about 4.9% titanium, about 3.0% aluminum, about 0.1% carbon, about 0.01% boron, about 2.8% tantalum, and a balance of nickel.

One suitable superalloy material is a nickel-based alloy having, by weight, up to about 10% chromium, up to about 8% cobalt, up to about 4% titanium, up to about 5% aluminum, up to about 6% tungsten, and up to about 5% tantalum. In one embodiment, the superalloy material has a composition, by weight, of about 9.75% chromium, about 7.5% cobalt, about 3.5% titanium, about 4.2% aluminum, about 6.0% tungsten, about 1.5% molybdenum, about 4.8% tantalum, about 0.08% carbon, about 0.009% zirconium, about 0.009% boron, and a balance of nickel.

One suitable superalloy material is a nickel-based alloy having, by weight, up to about 8% cobalt, up to about 7 chromium, up to about 6% tantalum, up to about 7% aluminum, up to about 5% tungsten, up to about 3% rhenium and up to about 2% molybdenum. In one embodiment, the superalloy material has a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, about 0.05% carbon, about 0.004% boron, about 0.01% yttrium, and a balance of nickel.

One suitable superalloy material is a nickel-based alloy having, by weight, up to about 10% chromium, up to about 8% cobalt, up to about 5% aluminum, up to about 4% titanium, up to about 2% molybdenum, up to about 6% tungsten and up to about 5% tantalum. In one embodiment, the superalloy material has a composition, by weight, of about 9.75% chromium, about 7.5% cobalt, about 4.2% aluminum, about 3.5% titanium, about 1.5% molybdenum, about 6.0% tungsten, about 4.8% tantalum, about 0.5% niobium, about 0.15% hafnium, about 0.05% carbon, about 0.004% boron, and a balance of nickel.

One suitable superalloy material is a nickel-based alloy having, by weight, up to about 10% cobalt, up to about 8% chromium, up to about 10% tungsten, up to about 6% aluminum, up to about 3% tantalum and up to about 2% hafnium. In one embodiment, the superalloy material has a composition, by weight, of about 9.5% cobalt, about 8.0% chromium, about 9.5% tungsten, about 0.5% molybdenum, about 5.5% aluminum, about 0.8% titanium, about 3.0% tantalum, about 0.1% zirconium, about 1.0% carbon, about 0.15% hafnium and a balance of nickel.

The superalloy material is capable of resisting predetermined temperatures, for example, temperatures of a hot gas path in a gas turbine. For example, in one embodiment, a first portion of the superalloy material is resistant to heat above a first/higher temperature, for example, about 1000° F., about 1250° F., about 1500° F., about 2000° F., or about 2200° F., and a second portion of the superalloy material is resistant to heat above a second/lower temperature, for example, between 800° F. and 1250° F., about 800° F., about 1000° F., about 1250° F., about 1500° F., or about 2000° F.

Referring to FIGS. 2-3, the molten material 202 is applied within a predetermined range of current, for example, between about 5 A and about 40 A, between about 5 A and about 10 A, or between about 30 A and about 40 A. In one embodiment, the composition of the molten material 202 is the same as the base metal 105. In another embodiment, the composition of the molten material 202 differs from the base metal 105. In this embodiment, the molten material 202 and the base metal 105 are superalloys selected from the compositions discussed above.

The molten material 202 is applied with a predetermined size. The predetermined size is based upon dimensions of the weld rod 209. For example, upon being applied, the molten material 202 generally forms a sphere having about 1.5 to 2.0 times a diameter in comparison to the diameter of the weld rod 209. In one embodiment, the diameter of the weld rod is about between 15 thousandths of an inch and 45 thousandths of an inch, or between about 25 thousandths of an inch and 35 thousandths of an inch, or at about 30 thousandths of an inch. In another embodiment, the molten material 202 is separately formed into spheres or other particles having the predetermined size apart from the application process.

In one embodiment, the predetermined size is based upon including an amount of the molten material 202 capable of covering a majority or all of the crack sensitive fusion boundary 104. In one embodiment, the predetermined size is based upon the number of layers to be formed. For example, in one embodiment, the predetermined size of the molten material 202 applied is substantially equal to a predetermined volume of the cavity 110. In a further embodiment, the predetermined volume is the volume of the cavity 110 proximal to the crack sensitive fusion boundary 104.

The boundary application layer 102 is at least partially solidified upon contacting the base metal 105. Upon being at least partially solidified, the boundary application layer 102 is spread, buttered, or otherwise manipulated and/or deposited to form the boundary region 205 (see FIGS. 1 and 4). For example, in one embodiment, the boundary region 205 is buttered to cover all or at least a portion of the crack sensitive fusion boundary 104 of the base metal 105. A filler region 206 is then formed on the boundary region 205.

Referring to FIGS. 4-7, the molten material 202 is applied to form one or more molten material application layers 207 until the filler region 206 is formed. The one or more molten material application layers 207 include the same material as the base metal 105, the same material as the molten material 202 in the boundary region 205, any suitable superalloy (including those disclosed above), or any combination thereof.

In one embodiment, the component 100 is formed by depositing a first application of the molten material 202 onto a surface within the cavity 110 of the base metal 105 where the first application of the molten material 202 at least partially solidifies (see FIG. 2). In one embodiment, the molten material 202 fully solidifies. The method continues with the melting of at least a portion of partially solidified material. This portion is then manipulated to form the boundary region 205 (see FIG. 3). A second application of the molten material 202, which may or may not include the same composition as the first application of the molten material 202, is then deposited onto the boundary region 205 as a first molten material application layer 207 (see FIG. 4). The first molten material application layer 207 is then manipulated to form the filler region 206 (see FIG. 5). In a further embodiment, a third application of the molten material 202, which may or may not include the same composition as the first application of the molten material 202 and/or the second application of the molten material 202, is then deposited onto the filler region 206 as a second molten material application layer 207 (see FIG. 6). The second molten material application layer 207 is then manipulated to further form filler region 206 (see FIG. 7). In one embodiment, a surface layer 211, which may or may not include the same composition as the first application of the molten material 202, the second application of the molten material 202, the third application of the molten material 202, the base metal 105, or any other suitable composition, is applied to the filler region 206, thereby forming the component 100 (see FIG. 1). Likewise, a fourth, fifth, sixth, or greater number of the molten material application layers 207 may be applied and manipulated to further form the filler region 206.

Figure 8:
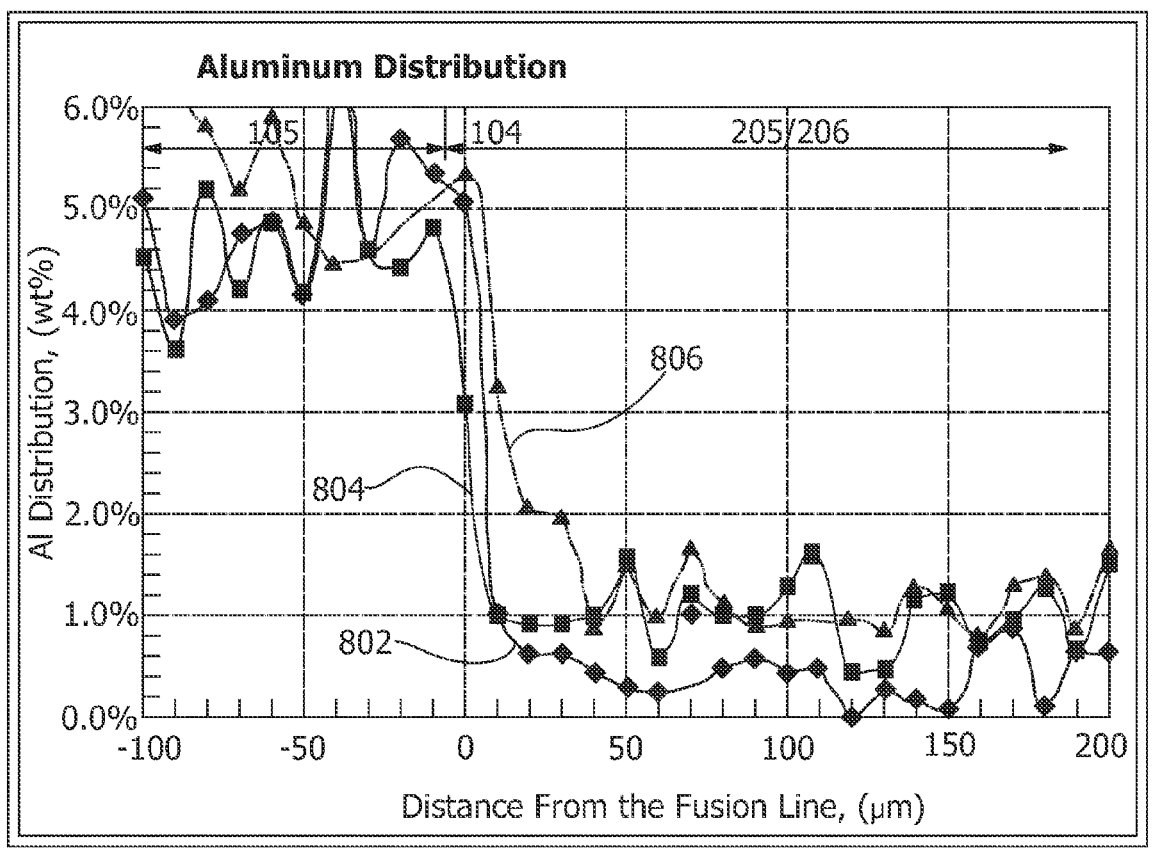
FIG. 8 is a graphic view illustrating an aluminum distribution for an exemplary component in comparison to components fabricated without the application and manipulation of molten material according to the disclosure.
Figure 9:
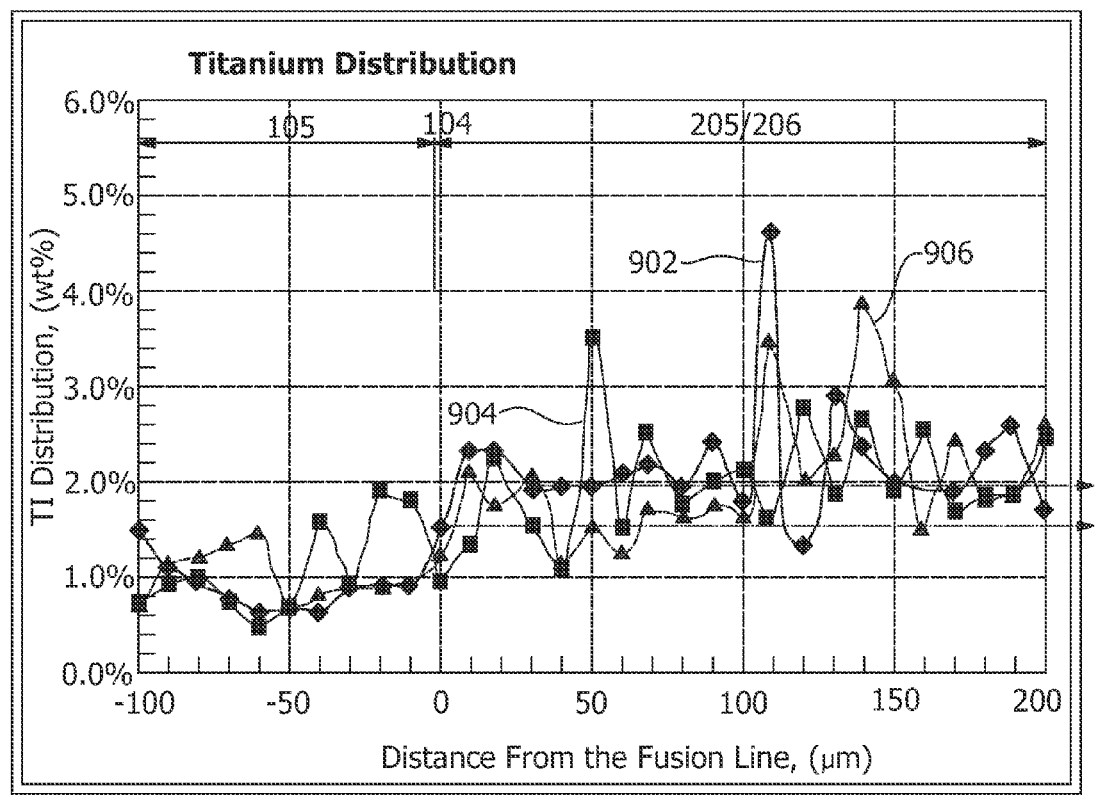
FIG. 9 is a graphic view illustrating a titanium distribution for an exemplary component in comparison to components fabricated without the application and manipulation of molten material according to the disclosure.

Referring to FIGS. 8 and 9, in one embodiment, the base metal includes a composition, by weight, of about 8.0% to about 8.7% chromium, about 9.0% to about 10.0% cobalt, about 5.25% to about 5.75% aluminum, about 0.60% to about 0.90% titanium, 9.30% to about 9.70% tungsten, about 0.40% to about 0.60% molybdenum, about 2.80% to about 3.30% tantalum, and a balance of nickel and the molten material 202 (forming the boundary region 205 and/or the molten material application layer(s) 207) includes a composition, by weight, of about 19.0% to about 21.0% chromium, about 19.0% to about 21.0% cobalt, about 0.30% to about 0.60% aluminum, about 1.90% to about 2.40% titanium, about 5.60% to about 6.10% molybdenum, about 2.40% to about 2.80% tantalum+ Aluminum, and a balance of nickel. In this embodiment, an aluminum distribution 802 corresponding to the present disclosure is lower within the boundary region 205 and/or the molten material application layer(s) 207 than a first non-drip weld process aluminum distribution 804 or a second non-drip weld process aluminum distribution 806. Similarly, the exemplary aluminum distribution 802 is lower within the boundary region 205 and/or the molten material application layer(s) 207 than a first non-drip weld process aluminum distribution 804 or a second non-drip weld process aluminum distribution 806. Similarly, the exemplary titanium distribution 902 is higher within the boundary region 205 and/or the molten material application layer(s) 207 than a first non-drip weld process titanium distribution 904 or a second non-drip weld process titanium distribution 906.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of fabricating a component, comprising:
    depositing a first molten material application onto a surface to form a partially solidified layer;
    manipulating at least a portion of the partially solidified layer to form a boundary region; and
    depositing a second molten material application onto the boundary region to form a filler region.

2. The method of claim 1, wherein the first molten material application includes substantially the same composition as the second molten material application.

3. The method of claim 1, wherein the first molten material application includes a different composition from the second molten material application.

4. The method of claim 1, further comprising melting the portion of the partially solidified layer prior to manipulating the portion to form the boundary region.

5. The method of claim 1, wherein one or more of the boundary region and the filler region includes a nickel-based superalloy selected from the group consisting of:
    a composition, by weight, of about 15% chromium, about 10% cobalt, about 4% tungsten, about 2% molybdenum, about 5% titanium, about 3% aluminum, and about 0.1% carbon, about 0.01% boron, about 3% tantalum, and a balance of nickel;
    a composition, by weight, of about 10% chromium, about 8% cobalt, about 4% titanium, about 5% aluminum, about 6% tungsten, about 1.5% molybdenum, about 5% tantalum, about 0.08% carbon, about 0.009% zirconium, about 0.009% boron, and a balance of nickel;
    a composition, by weight, of about 8% cobalt, about 7% chromium, about 6% tantalum, about 7% aluminum, about 5% tungsten, about 3% rhenium, about 2% molybdenum, about 0.15% hafnium, about 0.05% carbon, about 0.004% boron, about 0.01% yttrium, and a balance of nickel;
    a composition, by weight, of about 10% chromium, about 8% cobalt, about 5% aluminum, about 4% titanium, about 2% molybdenum, about 6% tungsten, about 5% tantalum, about 0.5% niobium, about 0.15% hafnium, about 0.05% carbon, about 0.004% boron, and a balance of nickel; and
    a composition, by weight, of about 9.5% cobalt, about 8.0% chromium, about 9.5% tungsten, about 0.5% molybdenum, about 5.5% aluminum, about 0.8% titanium, about 3.0% tantalum, about 0.1% zirconium, about 1.0% carbon, about 0.15% hafnium and a balance of nickel.

6. The method of claim 1, wherein the first molten material application is applied within a predetermined range of current, the predetermined range being between about 5 A and about 40 A.

7. The method of claim 1, further comprising applying a surface layer to the filler region.

8. The method of claim 1, further comprising treating the surface prior to depositing the first molten material, the treating being selected from the group consisting of preheating, solution heat treating, overage heat treating, and combinations thereof.

9. The method of claim 1, wherein the first molten material is formed by a gas tungsten arc welding apparatus or a plasma arc welding apparatus.

10. The method of claim 1, further comprising manipulating the second molten material application to further form the filler region.

11. The method of claim 10, further comprising depositing a third molten material application to further form the filler region.

12. The method of claim 11, further comprising manipulating the third molten material application to further form the filler region.

13. The method of claim 1, wherein the component includes a crack sensitive fusion boundary.

14. The method of claim 13, wherein the boundary region provides resistance to strain age cracking within a crack sensitive fusion boundary of the component.

15. The method of claim 13, wherein the boundary region covers the entire crack sensitive fusion boundary.

16. The method of claim 13, wherein the boundary region covers at least a portion of the crack sensitive fusion boundary.

17. The method of claim 13, wherein the boundary region fills about ⅓ of the volume of a cavity in the component.

18. A method of fabricating a component, comprising:
   depositing a first material onto at least a portion of a crack sensitive fusion boundary of the component;
   manipulating the first material to form a boundary region; and
   depositing a second material onto the boundary region;
   wherein the boundary region provides resistance to strain age cracking within the crack sensitive fusion boundary.

* * * * *